C. R. GILBERT.
STEAM COOKING-APPARATUS.
No. 183,295.  Patented Oct. 17, 1876.
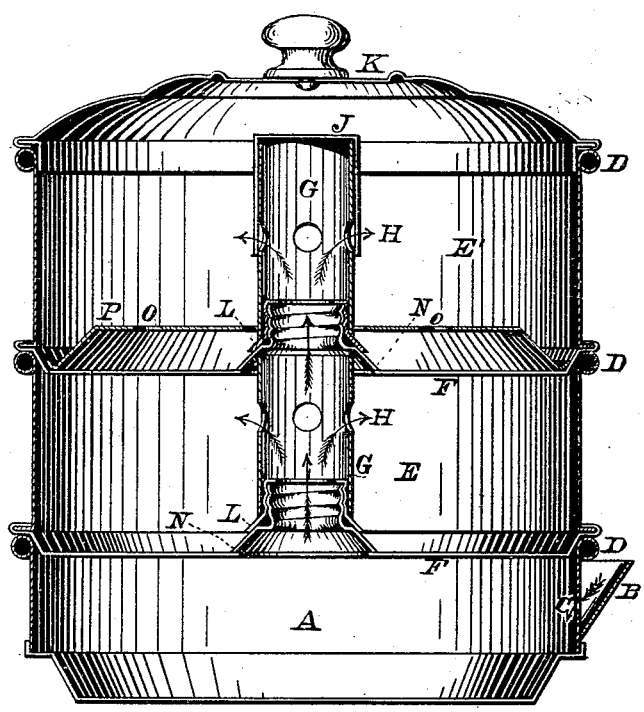
WITNESSES:
Frank Hirsch
Jno. T. Stark.
INVENTOR:
Charles R. Gilbert
by Michael J. Stark
Buffalo, N.Y.
his Attorney.

UNITED STATES PATENT OFFICE.

CHARLES R. GILBERT, OF CANASERAGA, NEW YORK, ASSIGNOR OF ONE-HALF HIS RIGHT TO FRANK E. BROWN, OF SAME PLACE.

IMPROVEMENT IN STEAM COOKING APPARATUS.

Specification forming part of Letters Patent No. 183,295, dated October 17, 1876; application filed September 26, 1876.

*To all whom it may concern:*

Be it known that I, CHARLES R. GILBERT, of Canaseraga, in the county of Allegany and State of New York, have invented certain new and useful Improvements on a Steam Cooking Apparatus; and I do hereby declare that the following description of my said invention, taken in connection with the accompanying sheet of drawings, forms a full, clear, and exact specification, which will enable others skilled in the art to which it appertains to make and use the same.

This invention relates, in general, to steam cooking apparatus; and it consists in the combination, with a water-reservoir, of a series of cooking-vessels placed one above the other upon said reservoir, and connected therewith by a central tube in each pot engaging with the next one above, and each provided with outlets to allow the steam generated in the lowest vessel to pass into the various pots. My invention furthermore consists in the arrangements of parts and details of construction, as will hereinafter be first fully described and then pointed out in the claims.

The object of my present invention is to more simplify cooking apparatus and to properly and thoroughly cook, steam, bake, or roast the articles of food so as to make them more delicious and palatable. It shall, furthermore, be operatable with either a direct or indirect application of heat, and not occupy more space upon a stove or range than a common cooking-pot.

In the accompanying sheet of drawings heretofore mentioned, the figure is a longitudinal sectional elevation of my improved steam cooking apparatus.

A is a cylindrical water-reservoir, provided with a conical dished bottom, so as to fit the usual openings in a stove or range. Its upper edge is wired to strengthen the vessel, and also to form a perfect joint with the cooking-vessels to be placed into said reservoir. The side of the vessel A has a projection or spout, B, with an aperture, C, leading therefrom, to enable the filling or refilling of the reservoir, and to provide means to ascertain the height of the contents of the same. Within the reservoir A is placed a cooking-vessel, E, having a bottom, F, constructed similar to that of the vessel A— *i. e.*, in a conical form—fitting the upper wired edge of the same snugly. Centrally within the cooking-pot E is placed a tube, G, corresponding in height to that of said pot, and provided with a number of apertures, H, near its upper extremity. This tube G is soldered to the exterior of a screw-coupling, L, which engages with a corresponding socket, N, soldered to the bottom F of said vessel E, over an opening therein of a size corresponding to that of the tube G. This socket N has an enlargement on its lower extremity, having tapering sides, and the screw-coupling L has a corresponding flaring edge, so that when these two parts are screwed together they form a perfectly tight joint, without the intervention of packing-rings or similar contrivances. E′ is a cooking-vessel constructed and arranged in every respect like the cooking-vessel E. J is a cap to close the tube G on its upper extremity. It extends downwardly for a distance sufficient to close the orifices H, and thereby the entire tube. A series of these vessels, E E′, may be arranged one above the other, if desired, so long as they are exact fac-similes of the vessels E or E′. P is a tray placed in either one of the cooking-vessels, and provided with a number of apertures, O. K is the cover, fitting either one of the vessels hereinbefore described. As heretofore described, the vessels E E′ are exact duplicates, and they are, therefore, interchangeable, so that either one or more may be used without trouble, and they produce, when placed together or "nested," a central passage by means of the tubes G. These tubes enter the next vessel above through the opening in the bottom, on account of the enlargement of the screw-socket N. All the vessels are provided with suitable handles for transportation, and the whole apparatus, when placed together, forms a very compact mass, and occupies no more room upon a stove or range than any one of the ordinary cooking-pots of a corresponding diameter.

In operation the lowest vessel is filled to the proper height with water, and the cooking-vessels placed in position. These vessels being made slightly tapering in their bottom part and fitting the next vessel below snugly, no steam can escape at the junctions of these parts. As soon as the water in the reservoir A is elevated in temperature sufficiently to produce steam, the latter will rise and pass through the central tube G into the various cooking-vessels E, through the openings H, striking, also, the bottom of each vessel, and thereby causing the articles of food contained in said vessels to be properly cooked or baked.

If it is desired to cook certain articles by an indirect application of heat, the steam communication can be shut off by placing the cap J upon the central tube G. In this case the bottom only of the respective vessel will be in contact with the steam, and thus produce the desired result. If more than one vessel is used, the one cooking with indirect heat should be placed uppermost, so as not to shut off the steam for the remaining vessels.

Instead of the cap J, I may close the opening or passage of each pot by removing the central tube G and screwing a blind cap upon the socket N. This would have the advantage of increasing also the capacity of said vessel.

In cooking various kinds of food it is often desirable to steam some of them without bringing them in contact with the hot water resulting from the condensation of the steam, which will always settle upon the bottom of the cooking-pots. To accomplish this purpose I provide the apparatus with a removable tray or rack, P, having apertures O upon which to place such article or articles to be steamed. This rack is placed so high above the bottom of its respective vessel as to allow the accumulation of all the condensed water resulting from the use of the apparatus for a long space of time.

Instead of providing all the vessels E with removable tubes G, as heretofore described, I may provide one pot only with such an arrangement, and furnish the remainder with tubes permanently soldered to the bottom, which arrangement, notwithstanding its cheapness, is just as effectual as long as at least one pot has a removable tube. For cleaning and other reasons the arrangement of the removable tubes may be preferable.

It is obvious that any article of food placed within the cooking-pots will, when subjected to the influences of either the direct or indirect heat, be evenly baked or cooked, and in a most delicious and palatable condition, containing all the juice and nutriment of such article.

Having thus fully described my invention, I desire to secure to me by Letters Patent of the United States—

1. In a steam cooking apparatus, such as hereinbefore described, the combination, with the vessels E, of the central conducting-tubes G, removably attached to said vessels by means of the coupling L and socket N, said couplings being provided with flaring flanges corresponding with each other, substantially as hereinbefore described, for the purpose stated.

2. The combination, with the reservoir A, having the spout B and aperture C, of a series of cooking-vessels, E, placed one upon the other, by means of the tapering bottoms F, and each provided with a central conducting-tube, G, having apertures H, the whole constructed and arranged to operate substantially in the manner and for the use and purpose described.

In testimony that I claim the foregoing as my invention, I have hereto set my hand and affixed my seal in the presence of two subscribing witnesses.

CHARLES R. GILBERT. [L. S.]

Attest:
MICHAEL J. STARK,
JNO. P. STARK.